Oct. 4, 1966　　　C. L. LAMPROS ETAL　　　3,276,398
APPARATUS FOR MAKING CONFECTION FIGURES
Filed Aug. 8, 1963　　　　　　　　　　　　3 Sheets-Sheet 2

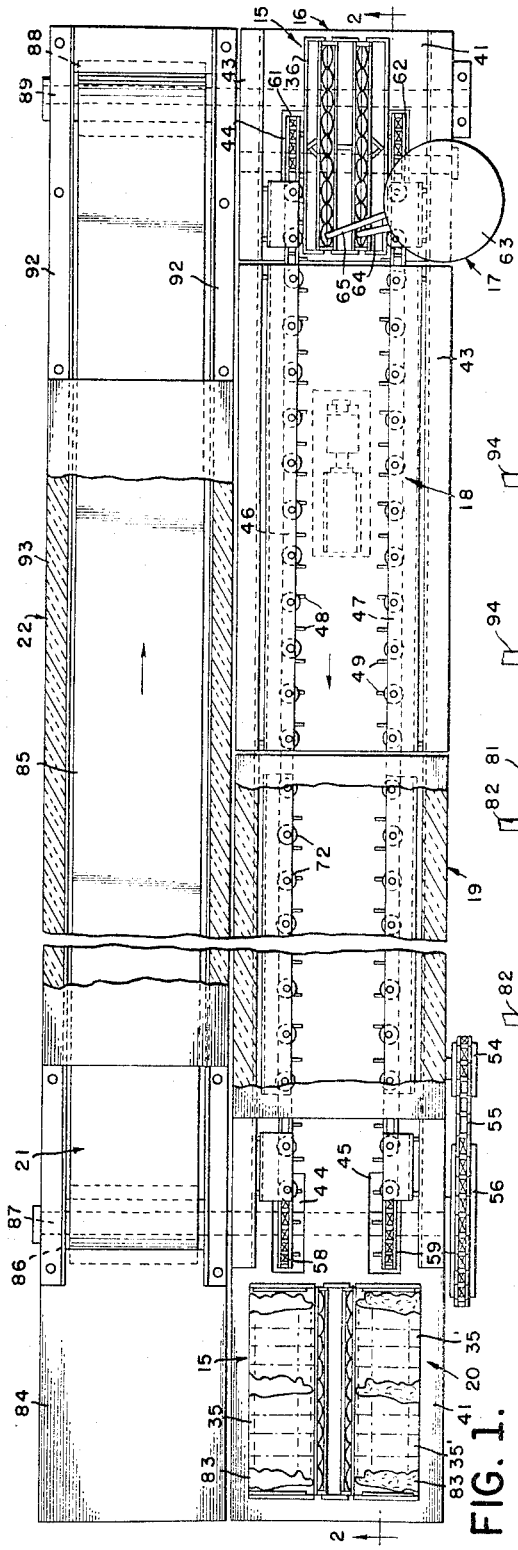
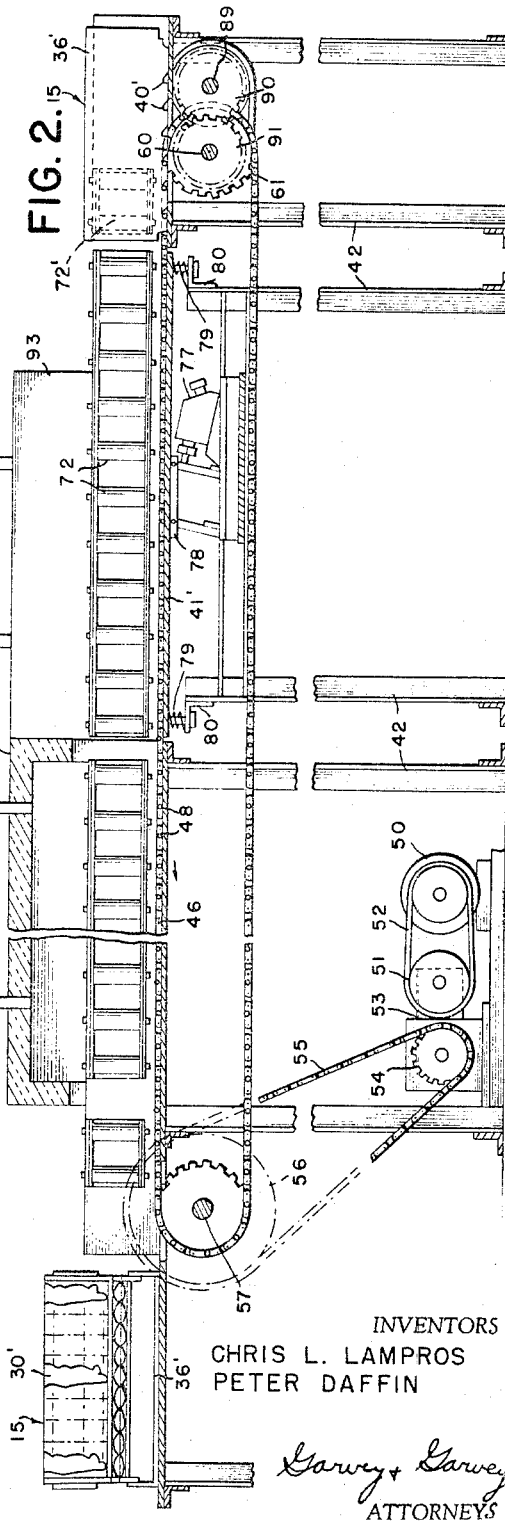

INVENTORS
CHRIS L. LAMPROS
PETER DAFFIN

BY *Garney & Garney*
ATTORNEYS

Oct. 4, 1966   C. L. LAMPROS ETAL   3,276,398
APPARATUS FOR MAKING CONFECTION FIGURES
Filed Aug. 8, 1963   3 Sheets-Sheet 3

INVENTORS
CHRIS L. LAMPROS
PETER DAFFIN

BY *Garvey & Garvey*
ATTORNEYS

United States Patent Office 3,276,398
Patented Oct. 4, 1966

3,276,398
APPARATUS FOR MAKING CONFECTION
FIGURES
Chris L. Lampros and Peter Daffin, Sharon, Pa., assignors to Peter Rabbit Candies Inc., Sharon, Pa.
Filed Aug. 8, 1963, Ser. No. 300,731
8 Claims. (Cl. 107—8)

The present invention is an Apparatus for Making Confection Figures, having for an object to provide an apparatus for mechanically producing confection figures in a continuous operation, beginning with pouring the molten confection into molds positioned in a filling station, followed by moving the molds through a vibration area for preventing voids from forming in the confection, pursuant to which the molds are moved through a cooling zone, until the confection is solidified, followed by removing the molded confection.

Other objects of this invention are to provide an apparatus for uninterrupted travel of molds filled with molten confection, succesively through a vibrating station and cooling tunnel, preparatory to removing the molded or formed confection, to provide apparatus for mechanical return of the empty mold through a heating zone, for transfer to the filling station of the apparatus; and to provide apparatus including conventional motive means for simultaneous operation of the means for transporting the filled molds and the means for returning the empty molds.

Further objects of the invention are to provide a continuous method of transferring filled confection molds, while the confection is in a molten state, to a vibrator for preventing formation of voids in the confection, followed by cooling and solidifying the confection before the molds reach the point where the molded confection is removed and the empty molds returned to the refill station of the apparatus.

Still further objects of the invention will be manifest from the following description of the present preferred form of the invention, taken in connection with the accompanying drawings, wherein:

FIG. 1 is a top plan view of the apparatus for making confection figures, constructed in accordance with the present invention;

FIG. 2 is a side elevational view of the same;

Figure 3:
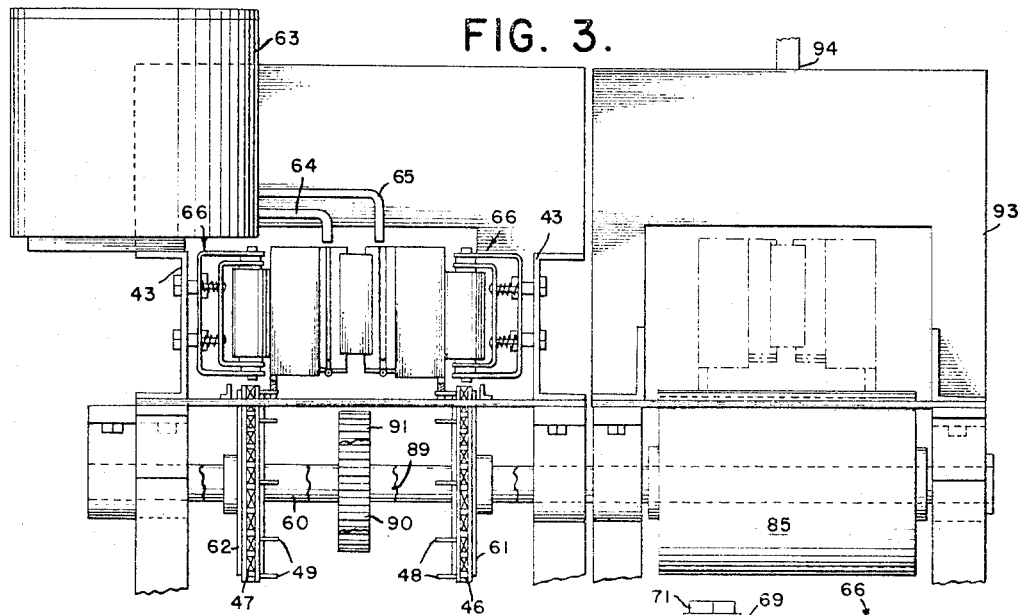
FIG. 3 is a fragmentary end elevational view of the same, portions thereof being broken away to disclose details of construction.

Referring now in greater detail to the drawings, there is illustrated in FIGS. 1 and 2, apparatus for making confection articles. This apparatus generally includes a mold assembly 15 adapted to be carried on a suitably supported conveyor 16 for successively carrying the mold assembly past a confection service station 17, through a vibration zone 18 and cooling area 19, to an unloading area 20 where the formed confection articles are removed. The apparatus further includes an auxiliary conveyor 21 adapted to receive the unloaded molds and return them to a point adjacent the starting end of conveyor 16. Intermediate the length of auxiliary conveyor 21 is a heating area 22 for warming mold assembly 15 during the return cycle.

As shown to advantage in FIGS. 6 to 10, mold assembly 15 is adapted to hold a plurality of molds in parallel rows and includes a central stationary mold support comprising a pair of inner mold frames 23 and 23' of U-shape in cross section, provided with horizontal bracing members 24, 24' joining the free terminals of frames 23, 23' and intermediate horizontal bracing members 25, 25'. Mold frames 23 and 23' are joined together in parallel spaced relationship by end walls 26 and 27 and intermediate vertically spaced bracing connectors 28 and 29. Pluralities of mold segments 30, 30' are arranged in uniplanar relation within frames 23, 23' and are secured to said frames by welding or the like.

Mold assembly 15 further includes a movable mold support comprising outer mold frames 31, 31' similar to frames 23, 23' respectively, and the lower portions thereof are connected at 32, 32' to inner mold frames 23, 23'. Horizontal bracing members 33, 33' join the free terminals of frames 31, 31' and intermediate horizontal bracing members are indicated at 34, 34'. A plurality of mold segments 35, 35' lie within frames 31, 31' in uniplanar relation and are welded or secured to said frames, in any other suitable manner. It will be noted from FIG. 6 that mold segments 35, 35' complement mold segments 30, 30' and stand in opposed relationship thereto, thereby providing rows of vertically divided molds.

The movable mold supports further include lateral imperforate walls 36, 36' which extend in longitudinal, spaced relation to outer mold support frames 31, 31'. The longitudinal terminals of said walls are bent inwardly and welded or fixed in any suitable manner to the vertical portions of U-shaped frames 31, 31'. V-shaped braces 37, 37' and 38, 38' are positioned in vertically spaced relationship between said walls and U-shaped frames at approximately the mid point of the mold assembly.

The lower extremities of walls 36, 36' are extended below the remainder of the mold assembly to provide flanges 39, 39', said flanges being provided with a plurality of opposed equi-spaced terminal notches 40, 40'.

Conveyor 16 includes a supporting surface 41 mounted on legs 42, the supporting surface being elongated and provided with lateral vertically extending walls 43. Supporting surface 41 is provided with pairs of longitudinally spaced openings 44, 45. Parallel endless sprocket chains 46, 47 are adapted for passage through pairs of openings 44, 45 to permit operation of the upper run above surface 41 and movement of the lower run beneath surface 41. Parallel endless sprocket chains 46, 47 operate in the direction indicated by the arrows in FIG. 1, which sprocket chains are equipped with inwardly directed, uniformly spaced fingers 48, 49 which move longitudinally of surface 41 synchronously and are adapted to engage notches 40, 40' of depending flanges 39, 39' as the mold assembly advances along the conveyor, as shown in FIG. 3. It will be noted from FIGS. 1 and 2, that chains 46, 47 are adapted to move the mold assembly from confection service station 17 to unloading area 20.

Suitable power means are provided for actuating chains 46, 47 including a motor 50 which drives a pulley 51 through a belt 52. Pulley 51 operates a speed reduction unit 53 including a sprocket gear 54 connected by a sprocket chain 55 to a second sprocket gear 56 mounted on a shaft 57 extending transversely of the present apparatus proximate unloading area 20. A pair of sprocket gears 58, 59 are mounted on shaft 57, to which gears sprocket chains 46, 47 respectively are connected. At the opposite end of the apparatus, adjacent confection service station 17 is a suitably journaled shaft 60 to which idler sprocket gears 61, 62 are attached, for receiving the opposite ends of endless chains 46, 47.

Confection service station 17 includes a receptacle 63 adapted to hold molten confection such as chocolate, from the lower extremities of which a pair of spouts 64, 65 extend, which spouts are adapted for super-positioning over the two rows of molds formed by the mold assembly, for depositing a predetermined amount of confection in each mold, as the assembly is advanced along conveyor 16.

Figures 4, 5:
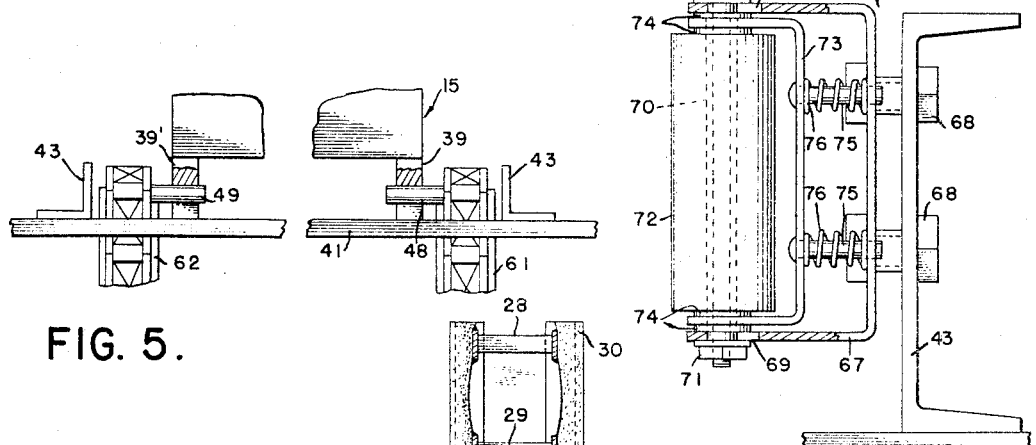
FIG. 4 is an enlarged elevational view of a pressure unit constructed in accordance with the present invention and illustrating its application, a portion thereof being broken away to disclose details.
FIG. 5 is an enlarged fragmentary view illustrating the manner of engagement of the mold assembly with the conveyor.

In order to retain the divided molds in assembled position, there are provided, on each side of conveyor 16, a plurality of pressure units 66, which are fixed to lateral vertically extending walls 43. A pressure unit 66 is illustrated in FIG. 4 and includes a main bracket 67 of U-shaped configuration, with the intermediate portion thereof disposed vertically, which portion is fixed to wall 43 by suitable nut and bolt means 68. Near its free terminals, bracket 67 is provided with enlarged vertically aligned openings 69, through which a supporting shaft 70 passes and is provided with nut and washer units 71. A pressure roller 72 is rotatably mounted on shaft 70. An auxiliary bracket 73, also of U-shaped configuration and disposed in a manner similar to bracket 67, is positioned within the latter and the terminals thereof are provided with openings of substantially the same diameter as shaft 70, through which shaft 70 passes. Washers are indicated at 74. Between the intermediate portion of bracket 73 and 67 are pins 75, around the shank of which are convolute springs 76 for normally urging said brackets apart. The springs also urge roller 72, which is mounted on auxiliary bracket 73, to the outermost position with respect to main bracket 67, as shown in FIG. 4. Rollers 72 exert inward pressure on walls 36, 36' of mold assembly 15, to positively prevent leakage of the confection, and rollers 72 are permitted to be moved toward main bracket 67 against the tension of spring 76 by movement of support shaft 70 in enlarged bracket openings 69. It will be noted from a consideration of FIGS. 1 and 2, that pressure units 66 are substantially coextensive with sprocket chains 46 and 47 and insure retention of the parts of the mold assembly in operative engagement with each other until the latter reaches the unloading zone 20. Auxiliary presser rollers 72', shown by dotted lines in FIG. 2, are employed for closing the mold segments introduced manually at the filling station.

After the mold assembly passes the confection service station 17, it moves to vibration zone 18 in order to remove any air pockets or voids which may be present in the molten confection within the molds. Vibration zone 18 includes a supporting surface 41' which is independent of the supporting surface 41 and is supported by a conventional vibrator assembly 77 which is connected to a supporting floor actuator 78. The longitudinal terminals of supporting surface 41' are provided with dampening springs 79 supported at 80, which control the degree of vibration of surface 41'. Adjacent vibration zone 18, the filled mold assembly enters cooling area 19 which includes a tunnel 81 open at both ends to permit the entry and exit of the mold assembly. The tunnel may be cooled in any suitable fashion such as by the introduction of cool air through ducts 82. Tunnel 81 may be of varying length and cooled to a temperature capable of solidifying the confection in the molds during the passage of the mold assembly through the cooling area.

Figure 10:
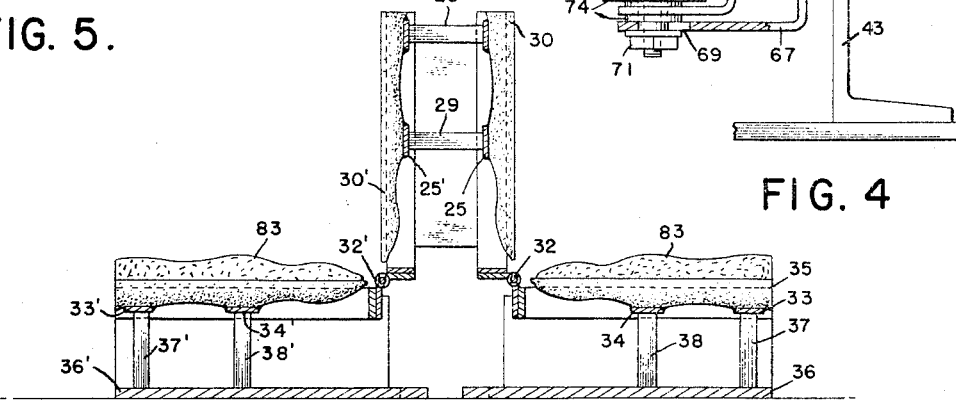
FIG. 10 is an end elevational view of the mold assembly showing the latter in open position, portions thereof being removed to disclose details.
Figure 6:
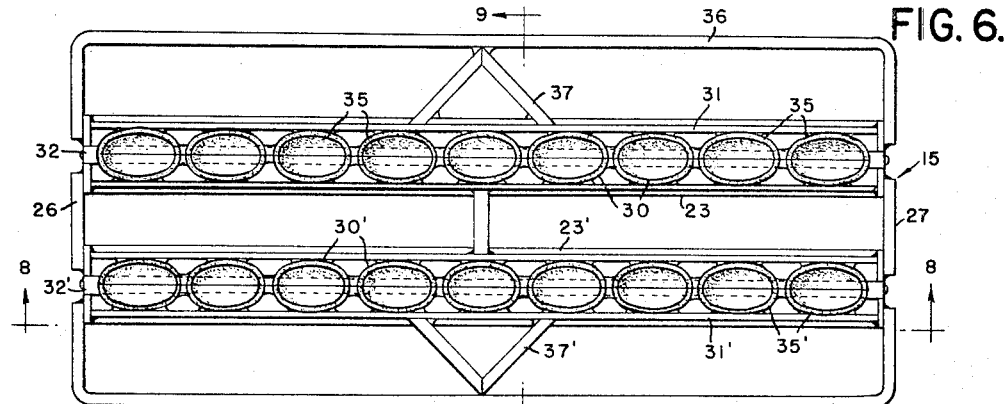
FIG. 6 is a top plan view of a mold assembly constructed in accordance with the present invention, showing latter in closed position.
Figure 8:
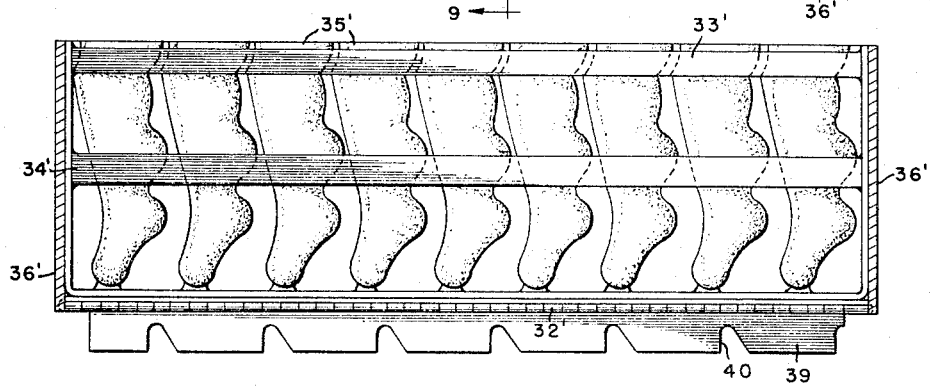
FIG. 8 is a sectional view taken along the line 8–8 of FIG. 6, looking in the direction of the arrows.
Figure 7:
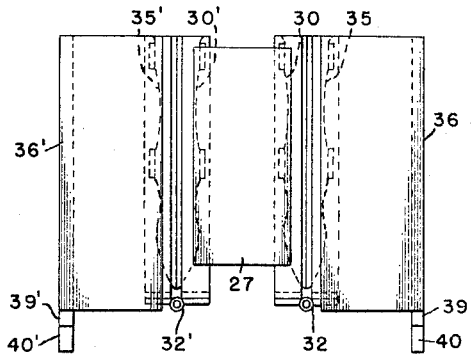
FIG. 7 is an end elevational view of the same.
Figure 9:
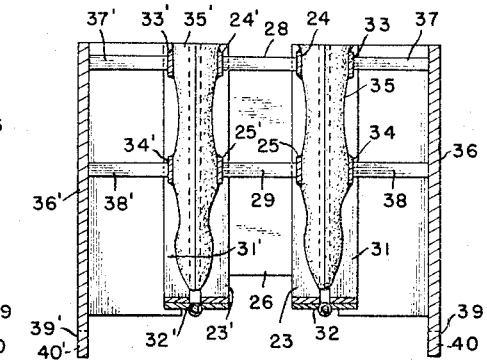
FIG. 9 is a sectional view taken along the line 9—9 of FIG. 6, looking in the direction of the arrows.

After the mold assembly has passed the cooling area, it is fed by chains 46, 47 to unloading zone 20, where the molds are opened manually in the manner shown to advantage in FIG. 10, on supporting surface 41 and the solidified confection figures 83 are removed. This completes the manufacturing cycle.

It is also within the contemplation of the present invention to return the empty mold assembly to the locus of confection service station 17 in condition for reuse, by means of an auxiliary conveyor 21. For this purpose there is provided a re-assembling surface 84 which is laterally adjacent unloading zone 20. After the mold is reassembled on surface 84, it is placed on conveyor 21 which is movable in the direction of confection service station 17. Conveyor 21 includes an endless belt 85. Belt 85 is engaged at one end with a spool 86 mounted on an idler roller 87, and at the other end by a spool 88 mounted on a driven shaft 89. Shaft 89 is driven by a gear 90 adapted for meshing engagement with a gear 91 fixed to shaft 60. Adjacent the lateral extremities of endless belt 85 are vertical walls 92 which are coextensive with the endless belt.

In accordance with the present invention, conveyor 21 is provided with a heating area 22 intermediate its length, which area includes a heating tunnel 93 for warming the mold assembly which has been chilled by passage through cooling zone 19. The heating of the mold assembly conditions the latter for immediate use in the manufacturing cycle. Tunnel 93 may be heated in any suitable manner such as by heating ducts 94. The tunnel may be of varying length and the temperature within the same is of sufficient degree to permit the molten confection to be poured into the molds without immediately solidifying in part and thereby producing an imperfect mold figure. After the mold assembly has passed through heating tunnel 93 and travels to the end of belt 85, it may then be transferred to surface 41 of conveyor 16, ready for reuse.

By means of the apparatus of the present invention, confection figures may be made in a continuous operation beginning with the pouring of the molten confection into the molds, followed by moving the molds through a vibration area to prevent voids from forming in the confection, pursuant to which the molds are moved through a cooling zone to solidify the latter, followed by removal of the molded confection. The empty mold assembly is then returned to the starting point on a conveyor belt, during the course of travel of which the chilled mold assembly is heated to ready the latter for another cycle of operation. With the method and apparatus of the present invention, the molded confection figures may be rapidly and flawlessly made, employing a minimum of mold assemblies.

While the preferred embodiment of the invention has been shown and described, it is nevertheless to be understood that various changes may be made therein, without departing from the spirit and scope of the claims hereto appended.

What is claimed is:

1. Apparatus for making confection bodies, an elongated supporting table, an assembly carried by the table including an endless conveyor and motive means in the table, operatively connected to said conveyor for driving the latter from one end of the table to the other, confection molds adapted for positioning on one end of the conveyor, preparatory to filling the molds with molten confection, the conveyor comprising spaced parallel sprocket chains, inwardly and laterally directed, uniformly spaced fingers on the sprocket chains, members extending from the lower portion of said confection molds, said members being provided with downwardly opening notches adapted to receive said fingers, to effect positive movement of the molds when the conveyor is driven, means operable to vibrate the conveyor during passage of thet latter over said means, and a cooler supported by the table, in operative proximity to the conveyor for solidifying the confection in the molds.

2. The apparatus of claim 1 wherein the assembly includes an endless belt, also in operative connection with said motive means, to effect travel of said belt, simultaneously with said conveyor, in a direction opposite to the latter, for returning the molds to a position adjacent the filling end of the conveyor, after the confection bodies have been removed from the molds.

3. Apparatus for making confection bodies including an elongated supporting table, an endless conveyor movable longitudinally of said table, pressure units mounted on said supporting table on opposite sides of said conveyor, and a mold assembly adapted for positioning on said conveyor, said mold assembly including a plurality of mold segments, at least one of said mold segments being movable into a vertical position coacting with another mold segment to close the mold assembly, said mold assembly being engaged by said pressure units for holding the mold segments together, to prevent leakage of confection therefrom, and means for filling the closed mold assembly.

4. A mold assembly for making confection bodies, including a central, stationary mold support comprising a pair of spaced, parallel inner mold frames, means for connecting said mold frames together, a plurality of mold segments arranged in uniplanar relation within each of said mold frames, the assembly further including movable mold supports embodying outer mold frames, the lower portions of said outer mold frames being hingedly connected to the lower portions of the mold frames of said stationary mold support, a plurality of mold segments arranged in uniplanar relation within each of said outer mold frames, the mold segments of said outer mold frames being in opposed relation to, and complementing, the mold segments of said inner mold frames, and adapted to form therewith vertically divided molds, the mold segments being normally in contiguous relation, said movable mold supports being adapted to be opened to disengage said complemental mold segments, to permit removal of the confection bodies therefrom.

5. Apparatus for making confection bodies, including an elongated supporting table, an endless conveyor movable longitudinally of said table, a confection mold assembly adapted for positioning on said endless conveyor, said assembly including a central, stationary mold support having interconnected inner mold frames, a plurality of mold segments arranged in uniplanar relation within each of said frames, the assembly further including outer movable mold frames hingedly connected to said inner mold frames, a plurality of mold segments mounted within each of said outer mold frames in opposed relation to said inner mold segments, means engageable with said mold assembly for advancing the latter along said table for filling the molds with molten confection, pressure units on opposite sides of a portion of said conveyor and engageable with the mold segments connected to the said outer movable mold frames, to normally retain the mold segments of said inner and outer frames in contiguous relationship and prevent leakage of the confection between the mold segments, said pressure units including rotary members for facilitating movement of said mold assembly along said conveyor, a vibrator assembly proximate said conveyor for vibrating said mold assembly, a cooling tunnel over a portion of said conveyor through which said mold assembly passes to solidify the molten confection, an unloading zone at one end of said conveyor beyond said pressure units, to permit the solidified confection to be removed from the mold assembly, an auxiliary conveyor laterally adjacent said conveyor for returning the empty mold assembly to the opposite end of said conveyor for reuse, and a heating tunnel over a portion of said auxiliary conveyor through which the mold assembly is adapted to pass.

6. The apparatus of claim 5 wherein the vibrator assembly includes means to control the degree of vibration.

7. The apparatus of claim 5 wherein the endless conveyor includes spaced parallel sprocket chains movable longitudinally above and beneath said supporting table, said sprocket chains being provided with a plurality of spaced, inwardly-directed fingers, means for actuating said sprocket chains, portions of said confection mold assembly being provided with complemental notches adapted for the reception of said fingers of the sprocket chains, to effect positive movement of the mold assembly upon actuation of said sprocket chains.

8. Apparatus for making confection bodies including an elongated supporting table, an endless conveyor movable longitudinally of said table, spring-loaded rollers mounted on said supporting table on opposite sides of said conveyor, and a mold assembly adapted for positioning on said conveyor, said mold assembly including a plurality of mold segments, at least one of said mold segments being movable into a vertical position coacting with another mold segment to close the mold assembly, said movable mold segment including a wall, said wall being yieldably engaged by said spring loaded rollers, for holding the mold segments together, to prevent leakage of confection therefrom.

References Cited by the Examiner

UNITED STATES PATENTS

| 1,138,929 | 5/1915 | Boyd | 107—54 |
| 2,760,448 | 8/1956 | Prasz | 107—19 |
| 2,811,933 | 11/1957 | Prasz | 107—8 |
| 2,896,557 | 7/1959 | Aasted et al. | 107—54 |

FOREIGN PATENTS

| 833,213 | 4/1960 | Great Britain. |

OTHER REFERENCES

Stockman et al., German application 1,121,915, printed January 1962.

WALTER A. SCHEEL, *Primary Examiner.*

J. SHEA, *Assistant Examiner.*